United States Patent [19]

Mukai

[11] Patent Number: 5,359,702
[45] Date of Patent: Oct. 25, 1994

[54] IMAGE SIGNAL INTERFACE SYSTEM

[75] Inventor: Hachiro Mukai, Minamiashigara, Japan

[73] Assignee: Fuji Photo Film Co., Ltd., Kanagawa, Japan

[21] Appl. No.: 968,476

[22] Filed: Oct. 29, 1992

Related U.S. Application Data

[63] Continuation of Ser. No. 399,194, Aug. 28, 1989, abandoned.

[30] Foreign Application Priority Data

Aug. 31, 1988 [JP] Japan ............... 63-219555
Aug. 31, 1988 [JP] Japan ............... 63-219557

[51] Int. Cl.$^5$ ............... G06F 7/00; G06F 13/00
[52] U.S. Cl. ............... 395/109; 395/106; 395/131; 358/519; 364/927.99; 364/943.5; 364/DIG. 2
[58] Field of Search ............... 395/106, 109, 131; 358/80

[56] References Cited

U.S. PATENT DOCUMENTS

| 4,679,074 | 7/1987 | Sugiura et al. | 358/80 |
| 4,864,391 | 9/1989 | Taguchi | 358/80 |
| 4,864,392 | 9/1989 | Sato | 358/80 |
| 4,866,511 | 9/1989 | Belmares-Sarabia et al. | 358/27 |
| 4,901,258 | 2/1990 | Akiyama | 395/131 |
| 4,949,284 | 8/1990 | Watanabe | 395/109 |
| 4,959,790 | 9/1990 | Morgan | 395/109 |
| 5,038,298 | 8/1991 | Matsumoto et al. | 364/518 |
| 5,038,300 | 8/1991 | Seiler et al. | 395/131 |
| 5,181,105 | 1/1993 | Udagawa et al. | 358/80 |

*Primary Examiner*—Parshotam S. Lall
*Assistant Examiner*—Ayni Mohamed
*Attorney, Agent, or Firm*—Sughrue, Mion, Zinn, Macpeak & Seas

[57] ABSTRACT

An image signal interface system includes an A/D converter for converting an analog image signal from one, at a time, of a plurality of image signal sources to digital image data, a table memory for storing as a device table attribute data on the analog image signal from the one of the image signal sources, and a control unit for reading the attribute data from the table memory and controlling the A/D converter based on the attribute data.

5 Claims, 6 Drawing Sheets

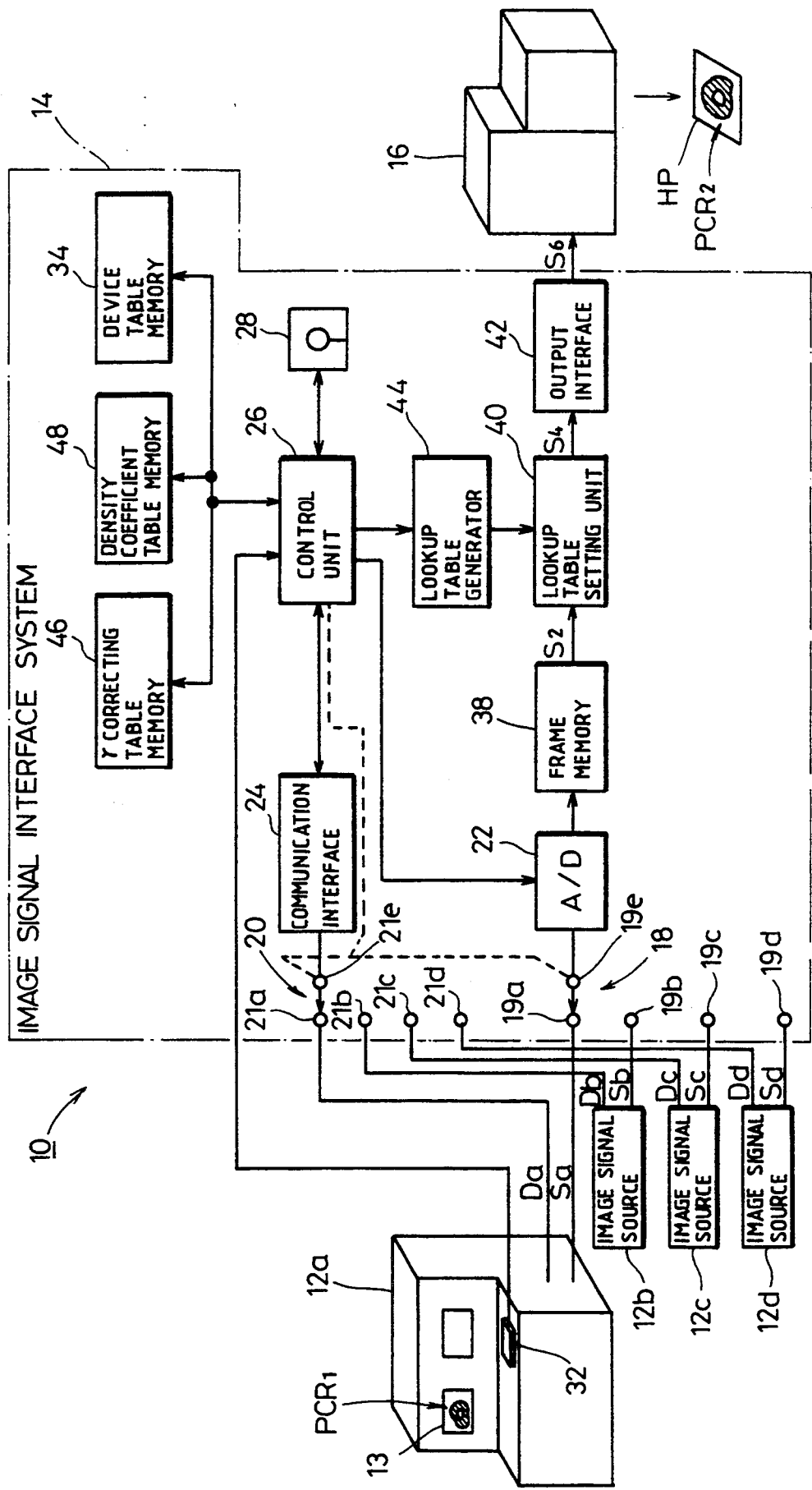

FIG.7

| | MAXIMUM DENSITY $D_{max\ n}$ | CONTRAST $C_n$ | NEGATIVE /POSITIVE $E_x$ |
|---|---|---|---|
| $CD_0$ | $D_{max\ 0}$ | $C_0$ | $E_0$ |
| $CD_1$ | $D_{max\ 0}$ | $C_0$ | $E_1$ |
| $CD_2$ | $D_{max\ 1}$ | $C_1$ | $E_0$ |
| $CD_3$ | $D_{max\ 1}$ | $C_1$ | $E_1$ |
| $CD_4$ | $D_{max\ 2}$ | $C_2$ | $E_0$ |
| $CD_5$ | $D_{max\ 2}$ | $C_2$ | $E_1$ |
| ⋮ | ⋮ | ⋮ | ⋮ |
| $CD_n$ | $D_{max\ n}$ | $C_n$ | $E_x$ |

IMAGE SIGNAL INTERFACE SYSTEM

This is a continuation of application Ser. No. 07/399,194, now abandoned, filed Aug. 28, 1989.

BACKGROUND OF THE INVENTION

The present invention relates to an image signal interface system for use between an image signal source and an image output device, and more particularly to an image interface system which, when hard copies are to be produced by an image output device in response to image signals generated by a plurality of image signal sources having different $\gamma$ characteristics, converts the image signals from the image signal sources to image signals that match the $\gamma$ characteristics of the image signal sources, and which, when analog image signals are generated by the image signal sources, converts the analog signals to digital image signals based on analog image signal attribute data which have been preset depending on the type of the image signal sources.

Medical image diagnostic apparatus such as CT scanners or the like allow localized regions of human bodies to be displayed as image information so that such localized body regions can clearly be viewed for medical analysis and diagnosis by doctors or the like. CT scanners or the like display image information on CRTs or the like to permit doctors to make medical diagnosis based on the displayed images. The image information displayed on the CRTs may be exposed to and recorded on photographic mediums and kept as hard copies, which can be used for medical diagnosis at any time and place. An image signal produced by an image signal source such as a CT scanner and representing such image information is usually applied as an analog video signal, i.e., an analog image signal, to an image output device such as a laser beam printer or the like, in which the analog video signal is converted to exposure data and recorded on a photosensitive medium.

The image output device may be supplied with analog image signals from various medical image diagnostic apparatus such as a CT scanner, an ultrasonic imaging apparatus, a nuclear magnetic resonance imaging apparatus, and the like which have been developed and used with the progress of medical diagnostic technology. Analog signals generated by these different medical image diagnostic apparatus may have different attributes such as a sampling frequency, a horizontal signal input period, a vertical signal input period, etc. Therefore, the image output device must produce exposure data while taking into account these attributes of the analog image signals.

One conventional image output device includes a plurality of converters designed for converting analog signals of different attributes, the converters being selectively connectable to the image signal source which is actually used. This arrangement is however complex. If a new image signal source of another kind is to be connected, a new converter which matches the new image signal source has to be added to the image output device. Accordingly, the image output device may be highly expensive.

According to another prior image output device, the conversion characteristics of a converter which converts an analog image signal to exposure data are set by DIP switches depending on the attributes of an analog image signal to be applied. However, it is highly tedious and time-consuming for the operator to shift the DIP switches, and the image output device is virtually difficult to adapt itself to use in connection with many types of image signal sources.

The medical image diagnostic apparatus such as a CT scanner, an ultrasonic imaging apparatus, and a nuclear magnetic resonance imaging apparatus, normally apply image signals to CRTs to display images for diagnosis. In order to display such images, digital image signals are converted to analog video signals before they are supplied to the CRTs.

When an image signal (analog video signal) is supplied from a medical image diagnostic apparatus to an image output device to produce a hard copy, the conversion characteristics ($\gamma$ characteristics) with which a digital image signal is to be converted to an analog video signal in the medical image diagnostic apparatus may not match the $\gamma$ characteristics of the image output device. If such a $\gamma$ characteristics mismatch exists, an image recorded on a photo-sensitive medium and reproduced as a hard copy is unclear and cannot be used for accurate medical diagnosis. Medical image diagnostic apparatus have different $\gamma$ characteristics, respectively.

It may be possible to provide a plurality of image output devices having different $\gamma$ characteristics, and one of such image output devices may be selected for use with a medical image diagnostic apparatus used so that their $\gamma$ characteristics are matched. This proposal is not economical and requires a large installation space for the plural image output devices.

The $\gamma$ characteristics of an image output device may be adjusted to match those of a medical image diagnostic apparatus in use. Such an adjusting procedure usually requires a highly skilled operator, and is tedious and time-consuming. Therefore, it cannot meet a basic demand in the medical field for quick diagnosis.

SUMMARY OF THE INVENTION

It is a primary object of the present invention to provide an image signal interface system which has means for storing in advance $\gamma$ correcting characteristics for a plurality of respective image signal sources having different $\gamma$ characteristics, and which operates to correct the $\gamma$ characteristics of an image signal generated by one of the image signal sources which is used, based on the corresponding $\gamma$ correcting characteristics, convert the corrected image signal to a certain image signal, and apply the corrected and converted image signal to a single image output device, so that hard copies of high image quality can quickly be produced by the image output device based on video signals generated by the image signal sources.

Another object of the present invention is to provide an image signal interface system for selecting desired attribute data from a plurality of preset sets of attribute data of analog image signals, and processing an analog image signal based on the selected attribute data, so that analog image signals generated by a variety of image signal sources can easily be processed with a simple arrangement.

Still another object of the present invention is to provide an image signal interface system for use between a plurality of image signal sources having different $\gamma$ characteristics and a single image output device for producing a hard copy based on an image signal produced by one of the image signal sources at a time, said image signal interface system, comprising a plurality of selectable $\gamma$ correcting tables for converting the image signals from the image signal sources to image signals which match the γ characteristics of the image output device.

Yet another object of the present invention is to provide the image signal interface system further including at least one density coefficient table for varying at least the maximum density and contrast of the image signals from the image signal sources.

Yet still another object of the present invention is to provide the image signal interface system wherein said image output device comprises a laser beam printer.

A still further object of the present invention is to provide the image signal interface system wherein each of said image signal sources comprises a medical image diagnostic apparatus.

A yet further object of the present invention is to provide the image signal interface system wherein said image output device comprises a laser beam printer and each of said image signal sources comprises a medical image diagnostic apparatus.

It is also an object of the present invention to provide an image signal interface system comprising an A/D converter for converting an analog image signal from one, at a time, of a plurality of image signal sources to digital image data, memory means for storing as a device table attribute data on said analog image signal from said one of the image signal sources, and control means for reading said attribute data from said memory means and controlling said A/D converter based on said attribute data.

Another object of the present invention is to provide the image signal interface system wherein said attribute data include a sampling frequency, a horizontal input period, and a vertical input period for said analog image signal.

Still another object of the present invention is to provide the image signal interface system wherein each of said image signal sources comprises a medical image diagnostic apparatus.

The above and other objects, features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 1 is a block diagram of a medical image recording system incorporating an image signal interface system according to the present invention;

FIG. 7 is a diagram showing a density coefficient table to be stored in a density coefficient table memory in the image signal interface system.

DETAILED DESCRIPTION OF THE PREFERRED EMBODIMENT

As shown in FIG. 1, a medical image recording system 10 generally comprises four image signals 12a through 12d of different types, such as a CT scanner, an ultrasonic imaging apparatus, a nuclear magnetic resonance imaging apparatus, etc., an image signal interface system 14, and an image output device 16 such as a laser beam printer or the like.

Figure 2A:
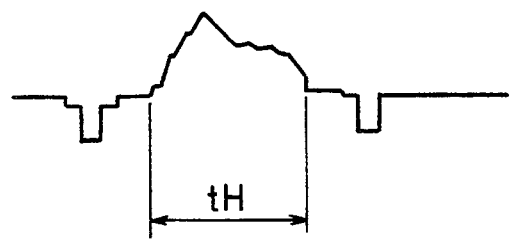
FIGS. 2(a) and 2(b) are diagrams showing analog image signals generated by image signal sources.
Figure 2B:
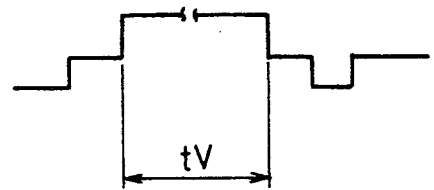

Each of the image signal sources 12a through 12d has a CRT 13 for displaying an image. The image signal sources 12a through 12d generate and apply video signals Sa through Sd, respectively, which are analog image signals having different attributes, and control signals Da through Dd, respectively, which are image control serial signals, to the image signal interface system 14. As shown in FIGS. 2(a) and 2(b), the video signals Sa through Sd are composed of horizontal and vertical signals. The horizontal image signal is transmitted in a horizontal input period $t_H$ (FIG. 2(a)), and the vertical signal is transmitted in a vertical input period $t_V$ (FIG. 2(b)).

The video signals Sa through Dd and the control signals Da through Dd which are generated by the image signal sources 12a through 12d are fed through electronic switches 18, 20 to A/D converter 22 and a communication interface 24 in the image signal interface system 14. The electronic switches 18, 20 are of a ganged configuration and each have four fixed contacts and one common contact. Specifically, the electronic switch 18 has four fixed contacts 19a through 19d and a common contact 19e, and the electronic switch 20 has four fixed contacts 21a through 21d and a common contact 21e.

The A/D converter 22 is supplied with attribute data such as data on sampling frequencies for the video signals Sa through Sd from a control unit 26. The A/D converter 22 converts the video signals Sa through Sd to digital video signals based on these supplied attribute data.

Figure 3:
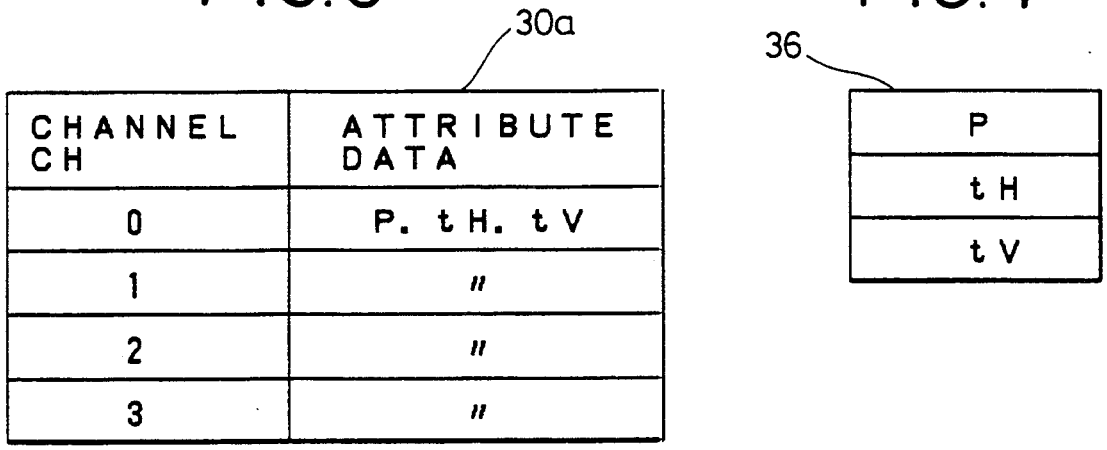
FIG. 3 is a diagram showing a device table generated in the image signal interface system.
Figure 4:
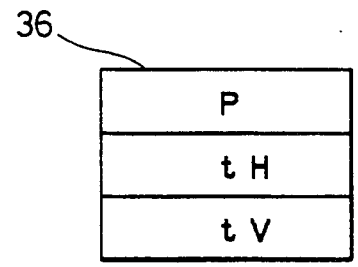
FIG. 4 is a diagram showing a video table generated in the image signal interface system.

The attribute data are stored as a device table 30a (FIG. 3) in an external memory 28 such as a floppy disk. The device table 30a contain channels CH (0 through 3) corresponding to the contacts 19a through 19d and 21a through 21d of the electronic switches 18, 20, and attribute data including sampling frequencies P, horizontal input periods $t_H$, and vertical input periods $t_V$ of the video signals Sa through Sd assigned respectively to the channels CH. The attribute data in the device table 30a are selected according to the number of a channel CH which is entered through a control panel 32 by the operator such as a doctor, and stored into a device table memory 34. The device table memory 34 has a video table 36 (FIG. 4) for storing the sampling frequency P, the horizontal input period $t_H$, and the vertical input period $t_V$ for the image signal from a selected one of the image signal sources 12a through 12d.

The digital image data from the A/D converter 22 are stored one frame at a time in a frame memory 38. Digital image data $S_2$ from the frame memory 38 are converted by a lookup table setting unit 40 which effects γ correction on image signals, to digital image data $S_4$ that are fed to the input terminal of an output interface 42. The lookup table setting unit 40 stores a γ correcting table which is generated by the control unit 26 and a lookup table generator 44. The γ correcting table is generated on the basis of the control information introduced from the communication interface 24, data supplied from the external memory 28 and stored in a γ correcting table memory 46, a density coefficient table memory 48, and the device table memory 34, and input data entered through the control panel 32 by the operator.

Figure 5A:
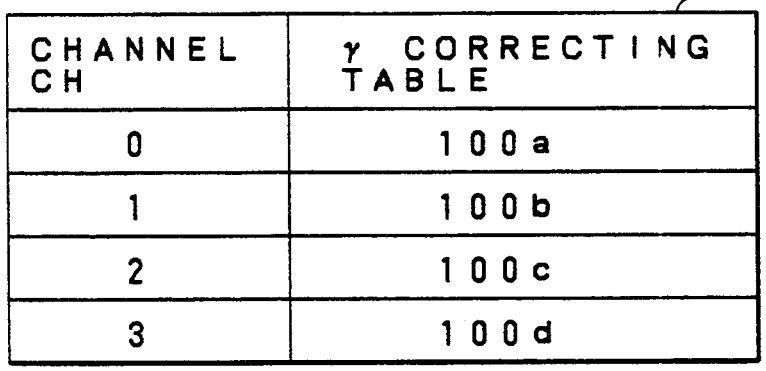
FIGS. 5(a) and 5(b) are diagrams showing other device tables generated in the image signal interface system.
Figure 5B:
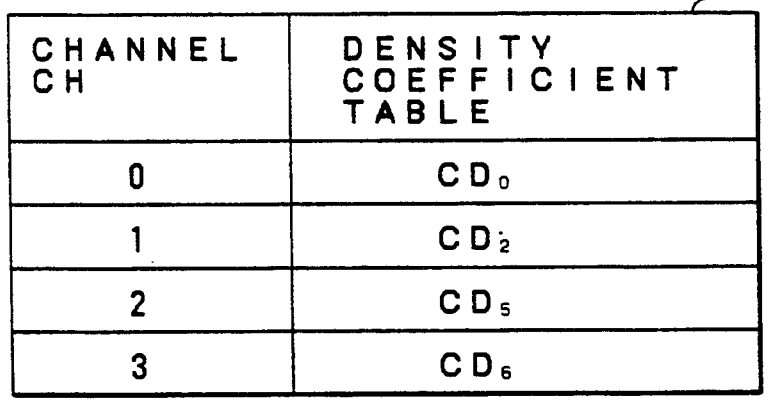

FIGS. 5(a) and 5(b) illustrate other device tables 30b, 30c which contain channels CH (0 through 3) corresponding to the contacts 19a through 19d and 21a through 21d of the electronic switches 18, 20, and γ correcting tables 100a through 100d and density coefficient tables $CD_0$, $CD_2$, $CD_5$, $CD_6$ assigned respectively to the channels CH. These device tables 30b, 30c are stored in the external memory 28. Desired γ correcting and density coefficient tables in these device tables 30b, 30c are selected according to a channel CH entered by the operator through the control panel 32, and transferred from the external memory 28 and stored into the γ correcting table memory 46 and the density coefficient table memory 48, respectively.

Figure 6A:
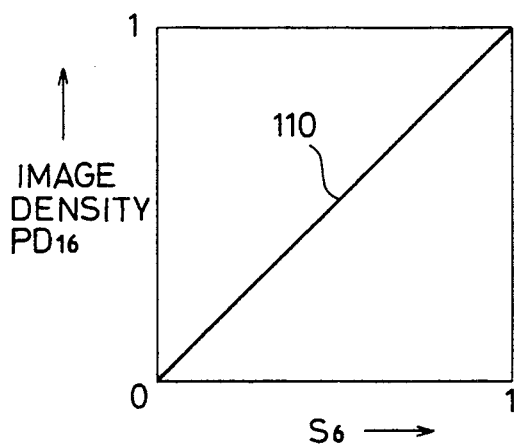
FIGS. 6(a) through 6(d) are diagrams illustrative of a process for generating a γ correcting table to be stored in a γ correcting table memory in the image signal interface system.
Figure 6B:
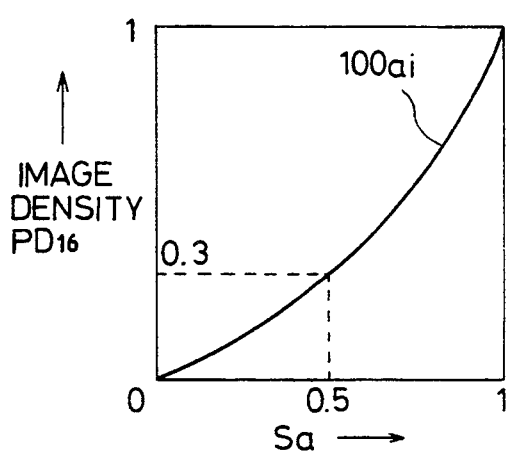

The γ correcting tables 100a through 100d serve to convert the γ characteristics of the image signal sources 12a through 12d connected to the image signal interface system 14 to those which match the γ characteristics of the image output device 16. For example, it is assumed that the image output device 16 has a linear γ characteristic curve 110 (FIG. 6(a)) such that an image density $PD_{16}$ on a hard copy HP is proportional to the level of an image signal $S_6$ applied to the image output device 16, and also assumed that γ characteristics 100ai (ideal γ characteristics) for reproducing an image $PCR_1$ displayed on the CRT 13 of the image signal source 12a with high fidelity on a hard copy HP are as shown in FIG. 6(b).

Figure 6C:
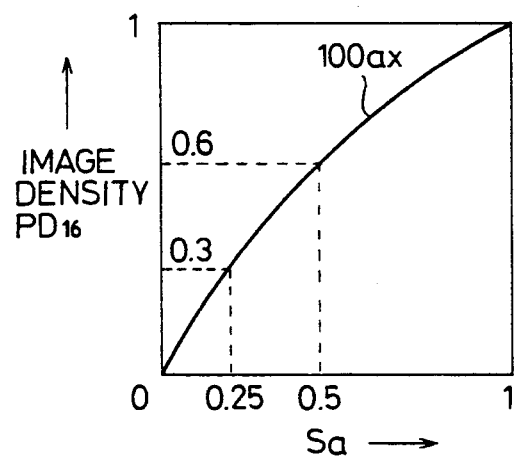

If no γ correction were effected on the image signal in the lookup table setting unit 40, then the signal $S_6$ applied to the image output device 16 would be substantially identical to the video signal Sa and have γ characteristics 100ax (FIG. 6(c)) (hereinafter referred to as "uncorrected γ characteristics") which deviate from the ideal γ characteristics 100ai (FIG. 6(b)). The uncorrected γ characteristics 100ax deviate from the ideal γ characteristics 100ai because the brightness of the image $PCR_1$ displayed on the CRT 13 is determined as a ramp function of the video signal Sa, and the density of an image $PCR_2$ reproduced on the hard copy HP is determined as a logarithmic function of the signal $S_6$.

Figure 6D:
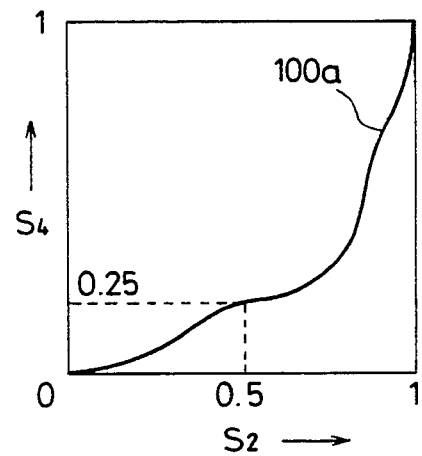

Therefore, the γ correcting table is required which converts the video signal Sa generated by the image signal source 12a to an image signal so that its γ characteristics will coincide with the ideal γ characteristics 100ai. The γ correcting table is generated as a γ correcting table 100a as shown in FIG. 6(d) based on the ideal γ characteristics 100ai and the uncorrected γ characteristics 100ax. More specifically, on the ideal γ characteristic curve 100ai, the image density $PD_{16}$ corresponding to the video image Sa=0.5 is $PD_{16}$=0.3, and on the uncorrected γ characteristic curve 100ax, the image density $PD_{16}$ corresponding to the video signal Sa=0.5 is $PD_{16}$=0.6, which is not the same as $PD_{16}$=0.3. Since the video signal Sa corresponding to the image density $PD_{16}$=0.3 on the uncorrected γ characteristic curve 100ax is Sa=0.25, the γ correcting table 100a may be prepared such that it can convert the digital image signal $S_2$=0.5 to the digital image signal $S_4$=0.25.

Likewise, the γ correcting tables 100b through 100d for use with the video signals Sb through Sd are generated depending on the characteristics of the CRTs or display means of the image signal sources 12b through 12d. These γ correcting tables 100a through 100d are stored in the external memory 28.

The graduations on the coordinate axes of FIGS. 6(a) through 6(d) showing the characteristic curves 110, 100ai, 100ax, 100a are expressed by normalized levels, i.e., those divided by the maximum levels of the image densities $PD_{16}$, the video signal Sa, and the digital image data $S_2$, $S_4$, for an easier understanding of the present invention.

The digital image data $S_2$ from the frame memory 38 are converted to digital image data $S_4$ by the lookup table setting unit 40 which stores the γ correcting table 100a, for example. The digital image data $S_4$ are then applied through the output interface 42 as a signal $S_6$ to the image output device 16. The image output device 16 then produces a hard copy HP based on the applied signal $S_6$. The density coefficient tables $D_0$, $D_2$, $D_5$, $D_6$ will be described later on.

The medical image recording system incorporating the image signal interface system of the present invention is basically constructed as described above. Operation and advantages of the medical image recording system will be described below. First, use of a γ correcting table only will be described, and then use of a γ correcting table and a density coefficient table will be described.

The lookup table generator 44 does not process the generated γ correcting tables 100a through 100d any further, and stores one of these γ correcting tables 100a through 100d depending on a selected one of the image signal sources 12a through 10d as a lookup table in the lookup table setting unit 40.

A doctor or another operator confirms a localized human region of the patient which is displayed as an image $PCR_1$ on the CRT 13 of one of the image signal sources 12a through 12d, e.g., the image signal source 12a. When it is necessary to produce a hard copy HP of the displayed image $PCR_1$ from the image output device 16, the doctor enters the number of the channel CH corresponding to the image signal source 12a through the control panel 32.

The control unit 26 fetches desired data from the device table 30a stored in the external memory 28 based on the channel number entered from the control panel 32, and stores the fetched data into the device table memory 34. If the channel 0 corresponds to the image signal source 12a, then the attribute data such as the sampling frequency P, the horizontal input period $t_H$, the vertical input period $t_V$ corresponding to the channel 0 are stored as the video table 36 (FIG. 4) in the device table memory 34. Also, the γ correcting table 100a corresponding to the channel 0 is fetched from the device table 30b and stored in the γ correcting table 46.

The control unit 26 operates the electronic switches 18, 20 to connect the common contacts 19e, 21e to the fixed contacts 19a, 21a, respectively. The control unit 26 then requests the image signal source 12a to transmit the video signal Sa through the communication interface 24, the common contact 21e, and the fixed contact 21a. Upon request for the transmission of the video signal Sa, the image signal source 12a first transmits the control signal Da for the image information about to be transmitted to the control unit 26 through the contacts 21a, 21e and the communication interface 24.

The numbers of the channels CH may be manually entered through the control panel 32 as described above. However, if it is known beforehand that the image signal source 12a will be used, then a power-on resetting function may be added to the image signal interface system 14, and the default setting for the channel number may be set to CH=0. With such an arrangement, when the power supply switch (not shown) of the image signal interface system 14 is turned on, the attribute data and the γ correcting table 100a for the channel 0 can automatically be stored into the memories 34, 46, respectively, in response to the control signal Da from the image signal source 12a.

The video signal Sa from the image signal source 12a is applied through the electronic switch 18 to the A/D converter 22. The sampling frequency P, the horizontal input period $t_H$, and the vertical input period $t_V$ of the video signal Sa have already been stored as the video table 36 in the device table memory 34, as described above. The A/D converter 22 converts the video signal Sa to a digital image signal at the sampling frequency P, and sends the digital image one frame at a time as digital image data to the frame memory 38.

The digital image data $S_2$ stored in the frame memory 38 are then transferred to the lookup table setting unit 40, and converted to digital image data $S_4$ by the lookup table setting unit 40 based on the γ correcting table 100a which has been transferred to and stored in the lookup table setting unit 40 under the control of the control unit 26. The digital image data $S_4$ are then introduced through the output interface 42 as an image signal $S_6$ into the image output device 16. The digital image data $S_2$ supplied to the lookup table setting unit 40 are substantially the same as the video signal Sa supplied to the image signal interface system 14, and the image signal $S_6$ applied to the image output device 16 is substantially the same as the digital image data $S_4$. Therefore, the horizontal and vertical axes of the γ correcting table 100a shown in FIG. 6(d) may represent the digital image data $S_2$ and the digital image data $S_4$, respectively.

The image signal interface system 14 connected between the image signal source 12a and the image output device 16 thus allows the image $PCR_1$ displayed on the CRT 13 of the image signal source 12a to be reproduced with high fidelity as an image $PCR_2$ on a hard copy HP produced by the image output device 16.

In the above description, the γ correcting table 100a for the video signal Sa produced by the image signal source 12a is employed. However, when one of the other video signals Sb through Sd is generated from a corresponding one of the other image signal sources 12b through 12d, a corresponding one of the γ correcting tables 100b through 100d may be stored in the memory 46, and then stored in the lookup table setting unit 40. The video signal can then be processed for γ correction so that a desired hard copy HP can be generated by the image output device 16.

Now, use of both a γ correcting table and a density coefficient table will be described below.

The γ characteristics of a medical diagnostic apparatus are determined depending on the characteristics of a signal source such as an X-ray, ultrasonic, or like source, the characteristics of an imaging device, and the characteristics of a display means such as a CRT. The level of an output video signal produced by the medical diagnostic apparatus may vary due to the γ characteristics of the medical diagnostic apparatus depending on the human body region to be diagnosed, e.g., depending on whether a brain, a lung, a heart, or the like is to be diagnosed. If the video signal is converted according to one of the γ correcting tables 100a through 100d only and then reproduced as an image by the image output device 16, then the reproduced image may be low in contract and may not be used for diagnosing the imaged human body region. In such a case, it is necessary to calculate new γ correcting tables 105a through 105d from the correcting tables 100a through 100d and density coefficient tables (described below), and use such new γ correcting tables as lookup tables.

As shown in FIG. 7, density coefficient tables $CD_0$ through CDn contain maximum densities Dmaxn (n=0 through n), corresponding contrasts Cn (n=0 through n), and corresponding negative/positive conversion coefficients Ex (n=0 or 1). The negative/positive conversion means conversion of an image $PCR_1$ from a positive image to a negative image or from a negative image to a positive image depending on the negative/positive conversion coefficient $E_0$ or $E_1$. The negative/positive conversion is required when a produced hard copy HP is to be observed on an illuminating box or the like. The device table 30c (FIG. 5(b)) contains the density coefficient tables $CD_0$, $CD_2$, $CD_5$, $CD_6$ corresponding to the image signal sources 12a through 12d, respectively.

The doctor or other operator selects the channel 0, for example, which corresponds to the image signal source 12a. The control unit 26 connects the contacts 19a, 19e of the electronic switch 18 and the contacts 21a, 21e of the electronic switch 20, and supplies data of the γ correcting table 100a, which is supplied from the external memory 28 and stored in the γ correcting table memory 46, to the lookup table generator 44. The control unit 26 also supplied data on the maximum density Dmaxn=Dmax$_0$ and data on the contrast Cn=$C_0$ of the density coefficient table $CD_0$, which are supplied from the external memory 28 and stored in the density coefficient memory 48, to the lookup table generator 44.

Figure 8A:
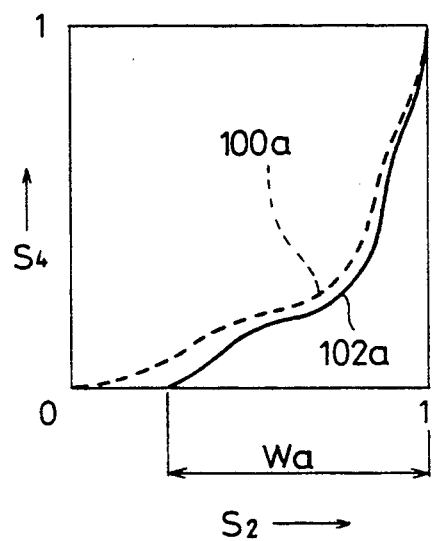
FIGS. 8(a) and 8(b) are diagrams illustrative of a process for converting a γ correcting table based on the density coefficient table shown in FIG. 7.
Figure 8B:
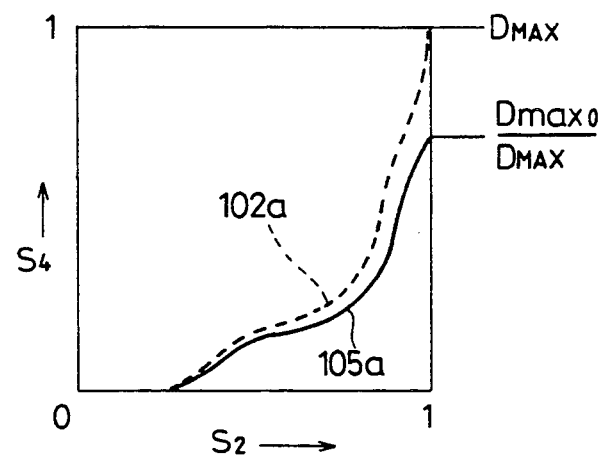

The lookup table generator 44 then generates a γ correcting table 102a (FIG. 8(a)) by converting the contrast of the γ correcting table 100a, and thereafter generates a new γ correcting table 105a (FIG. 8(b)) by converting the maximum density of the γ correcting table 102a. More specifically, when the value $S_4$ of the γ correcting table 100a is expressed by the function $S_4=f(S_2)$, the γ correcting table 102a is expressed by the function $S_4=C_0.f(S_2)$ with the value of the contrast Cn=$C_0$ being of a natural number. If it is assumed that the value of the maximum density Dmaxn=Dmax$_0$ is of a natural number and the density is indicated by $D_{MAX}$ when the digital image data $S_4=1$, then the new γ correcting table 105a is given by the function:

$$S_4 = \frac{Dmax_0}{D_{MAX}} \cdot C_o \cdot f(S_2)$$

Since the value of the maximum density $D_{MAX}$ is normalized as $D_{MAX}=1$ in this embodiment, the function $S_4$ is given as:

$$S_4 = Dmax_0 \cdot C_0 \cdot f(S_2)$$

The new γ correcting table 105a is then stored as a new lookup table in the lookup table setting unit 40.

The digital image data $S_2$ corresponding to the video signal Sa produced by the image signal source 12a are correcting table 105a stored in the lookup table setting unit 40. Thereafter, the digital image data $S_4$ are converted to an image signal $S_6$ by the output interface 42. The image output device 16 produces a hard copy HP carrying a reproduced image $PCR_2$ based on the image signal $S_6$ applied to the image output device 16. The digital image data $S_2$ are data which have been converted by the A/D converter 22 based on the selected attribute data corresponding to the image signal source 12a.

The image $PCR_2$ produced on the hard copy HP after conversion based on the new $\gamma$ correcting table 105a is an image which has a relatively large number of gradation levels in a small range wa of the digital image data $S_2$, i.e., the video signal Sa, as shown in FIG. 8(a). Further, the maximum density Dmax is lowered to ($Dmax_0$/Dmax) as shown in FIG. 8(b), thus limiting the density of a high-density image area. This is because the number of pixels of the image $PCR_1$ on the display of the image signal source is usually smaller than the number of pixels of the image $PCR_2$ on the hard copy HP produced by the image output device 16, and if the image were reproduced at the same density level, then the differences between the gradation levels of the pixels would be increased, making the reproduced image look rather rough. By limiting the maximum density value, the differences between the densities of the pixels are reduced and the reproduced image looks softer and can be observed easily.

By thus employing the density coefficient table $CD_0$, for example, the gradations of an output image can be varied, so that they can be converted to produce an optimum reproduced image of a localized human body region to be diagnosed.

In the above embodiment, video signals produced by image signal sources are analog signals. However, digital image signals may be generated by image signal sources and applied through an input interface (not shown) directly to the frame memory 38 without A/D conversion.

The conversion of the contrast of an image signal may be effected by not only varying the gradient of the function while fixing the maximum level of the image signal as shown in FIG. 8(a), but also varying the gradient of the function while fixing a suitable level of the image signal, e.g., a ½ level thereof.

With the present invention, as described above, an image signal produced by a selected one of the image signal sources having different $\gamma$ characteristics is converted by the image signal interface system to a signal matching the y characteristics of the image output device. With the image signal interface system connected between the image signal sources and the single image output device, hard copies of high image quality can quickly be produced by the image output device based on all image signals produced by the image signal sources. Since the $\gamma$ characteristics of the image output device can be apparently varied using density coefficient tables, the gradations of images on output hard copies can easily be modified. Consequently, the density of an image of a localized human body region to be diagnosed may be converted to an image density with which the doctor can observe the image easily.

The image output device and the image signal interface system may be combined together into a unitary apparatus.

Moreover, attribute data on analog image signals of the image signal sources are stored, and desired attribute data are selected depending on a selected one of the image signal sources for the processing of the analog image signal generated by the selected image signal source. Accordingly, the image can be processed in a manner suitable for the selected one of the various image signal sources. Since the image signal interface system does not require any converter for converting the attributes of analog image signals, the image signal interface system is simple in arrangement.

Although a certain preferred embodiment has been shown and described, it should be understood that many changes and modifications may be made therein without departing from the scope of the appended claims.

What is claimed is:

1. An image signal interface system for use between a plurality of image signal sources having different $\gamma$ characteristics and a single image output device for producing a hard copy based on an image signal produced by one of the image signal sources at a time, said image signal interface system comprising:

a plurality of selectable $\gamma$ correcting tables for converting the image signals from the image signal sources to image signals which match the $\gamma$ characteristics of the image output device;

at least one density coefficient table for varying at least the maximum density and contrast of the image signals from the image signal sources;

a lookup table setting unit for converting the image signals from one of the image signal sources according to correction data from said $\gamma$ correcting table and said density coefficient table corresponding to said one of the image signal sources such that $\gamma$ correction and gradation correction occur simultaneously in said lookup table setting unit; and control means for initiating transmission of said image signals from said one of the image signal sources and for supplying information from said plurality of $\gamma$ correcting tables and from said at least one density coefficient table to said lookup table setting unit.

2. An image signal interface system according to claim 1, wherein said image output device comprises a laser beam printer.

3. An image signal interface system according to claim 1, wherein each of said image signal sources comprises a medical image diagnostic apparatus.

4. An image signal interface system according to claim 1, wherein said image output device comprises a laser beam printer and each of said image signal sources comprises a medical image diagnostic apparatus.

5. An image signal interface system for use between a plurality of image signal sources having different $\gamma$ characteristics and a single image output device for producing a hard copy based on an image signal produced by one of the image signal sources at a time, said image signal interface system comprising:

a communication interface for receiving control signals from said image signal sources;

an A/D converter;

a first switch for selectively connecting each of said image signal sources to said A/D converter;

a plurality of device tables containing attribute data corresponding to each of the image signal sources;

a plurality of selectable $\gamma$ correcting tables for converting the image signals from the image signal sources to image signals which match the $\gamma$ characteristics of the image output device;

at least one density coefficient table for varying at least the maximum density and contrast of the image signals from said one of the image signal sources;

a lookup table setting unit for converting the image signals from one of the image signal sources according to correction data from said γ correcting table and said density coefficient table corresponding to said one of the image signal sources such that γ correction and gradation correction occur simultaneously in said lookup table setting unit;

control means for receiving information from said communication interface and said memory means and for controlling said A/D converter with said attribute data and supplying said lookup table setting unit with data from said γ correcting table and said density coefficient table; and an output means for reproducing an image based on the image signal from said one of the image signal sources.

* * * * *